(12) United States Patent
Xu et al.

(10) Patent No.: US 8,873,754 B2
(45) Date of Patent: Oct. 28, 2014

(54) PROXY-BASED ENCRYPTION METHOD, PROXY-BASED DECRYPTION METHOD, NETWORK EQUIPMENT, NETWORK DEVICE AND SYSTEM

(71) Applicant: Huawei Technologies Co., Ltd., Shenzhen (CN)

(72) Inventors: Lei Xu, Beijing (CN); Xiaoxin Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/687,968

(22) Filed: Nov. 28, 2012

(65) Prior Publication Data

US 2013/0156188 A1 Jun. 20, 2013

Related U.S. Application Data

(63) Continuation of application No. PCT/CN2012/075849, filed on May 22, 2012.

(30) Foreign Application Priority Data

Dec. 20, 2011 (CN) .......................... 2011 1 0430299

(51) Int. Cl.
*H04K 1/00* (2006.01)
*H04L 9/30* (2006.01)
*H04L 9/28* (2006.01)
*H04L 9/08* (2006.01)
*H04L 9/32* (2006.01)

(52) U.S. Cl.
CPC ............ *H04L 9/0861* (2013.01); *H04L 9/3073* (2013.01); *H04L 9/0827* (2013.01); *H04L 2209/76* (2013.01); *H04L 9/28* (2013.01)
USPC ............ 380/255; 380/283; 713/168; 713/170

(58) Field of Classification Search
CPC ......... H04L 63/0428; H04L 9/08; H04L 9/00; H04K 1/00; H04K 9/0883
USPC ........................ 380/28–30, 44–47, 255–286; 713/150–154, 160–167, 189–193
See application file for complete search history.

(56) References Cited

U.S. PATENT DOCUMENTS

2009/0313471 A1* 12/2009 Bjorkengren et al. ........ 713/170
2012/0131335 A1    5/2012 Bailey et al.

FOREIGN PATENT DOCUMENTS

| CN | 101141244 A | 3/2008 |
| CN | 10188300 A | 11/2010 |

(Continued)

OTHER PUBLICATIONS

International Search Report issued in corresponding PCT Application No. PCT/CN2012/075849; Dec. 20, 2011.

(Continued)

*Primary Examiner* — Evans Desrosiers
(74) *Attorney, Agent, or Firm* — Huawei Technologies Co., Ltd.

(57) ABSTRACT

A proxy-based encryption method includes generating, according to a private key of a sending end and a public key of a receiving end, proxy keys that correspond to at least two proxy servers, respectively. The number of the proxy keys is equal to the number of the proxy servers. The method further includes sending encrypted ciphertexts and the proxy keys that correspond to the at least two proxy servers respectively to the at least two proxy servers, respectively, so that the at least two proxy servers re-encrypt the encrypted ciphertexts according to the corresponding proxy keys.

6 Claims, 4 Drawing Sheets

(56) References Cited

FOREIGN PATENT DOCUMENTS

| CN | 101883100 A | 11/2010 |
|---|---|---|
| KR | 2002-0083551 A | 11/2002 |
| WO | 2011/012642 A2 | 2/2011 |

OTHER PUBLICATIONS

Shengming, Lou et al. "Identity Based Proxy Re-Encryption with Threshold Multi-Proxy" Journal of Natural Science of the He Long Jiang University. vol. 27 No. 2 Apr. 2010 (Including English Translation).

Ateniese et al., "Improved Proxy Re-Encryption Schemes with Applications to Secure Distributed Storage" International Association for Cryptologic Research, Jan. 11, 2006, 25 pages.

Tran et al., "Towards Security in Sharing Data on Cloud-Based Social Networks" ICICIS, Dec. 13, 2011, 5 pages.

Zhu, "A Cost-Efficient Secure Multimedia Proxy System" IEEE Transactions on Multimedia, vol. 10, No. 6. Oct. 1, 2008, 7 pages.

Lou et al., "Identity-based proxy re-encryption with threshold multi-proxy" Journal of Natural Science of Helong Jiang University, vol. 27, No. 2, Apr. 2010, 16 pages.

* cited by examiner

PROXY-BASED ENCRYPTION METHOD, PROXY-BASED DECRYPTION METHOD, NETWORK EQUIPMENT, NETWORK DEVICE AND SYSTEM

CROSS-REFERENCE TO RELATED APPLICATIONS

This application is a continuation of International Application No. PCT/CN2012/075849, filed on May 22, 2012, which claims priority to Chinese Patent Application No. CN 201110430299.0, filed on Dec. 20, 2011, both of which are hereby incorporated by reference in their entireties.

FIELD OF THE APPLICATION

The present application relates to the field of communications technologies, and in particular, to a proxy-based encryption method, a proxy-based decryption method, a network equipment, a network device and a system.

BACKGROUND OF THE APPLICATION

An encrypted file sharing system is based on a method for achieving security of network storage at a file system layer. The system provides end-to-end security, that is, file data is stored on a proxy server after encryption, and all operations involved in the encryption and decryption of files in the system are completed on a client. Ciphertext data is stored on the proxy server, which prevents information leakage caused by system hacking or unauthorized operations of a manager.

The main problem that the encrypted file sharing system faces is key management, including creation, accessing, distribution and revocation of keys. The existing key management methods in the encrypted file sharing system can be divided into two types: one is to access files in groups, namely, to group files having the same access right together, the same group of files sharing one key, which is sent to authorized users by a file owner or a trusted third party; and the other is to encrypt the keys of the files with the public key of each authorized user, where each file may have different encryption keys after a series of computations executed by the proxy server.

Proxy re-encryption is rather typical for the use of the second type of methods, which is characterized by the capacity of achieving granularity-level sharing of the files, and the key in the encrypted file sharing system using the proxy re-encryption may be distributed to authorized users by a partially trusted proxy in specific implementation.

The existing proxy re-encryption requires each user to possess a public key and a private key, in which the public key is a key made public by a user to another user who is authorized by the user, while the private key is a key that is saved by a user and only known to the user; furthermore, data or a file encrypted with a certain public key can only be decrypted with a corresponding private key, and likewise, a file encrypted with a certain private key can only be decrypted with a corresponding public key.

In the prior art, there is only one proxy server participating in the existing proxy re-encryption method; as a result, if the proxy server fails, the proxy re-encryption process may not be completed smoothly, and the file sharing process will be forced to end. Therefore, the existing proxy re-encryption method has low reliability and security.

SUMMARY OF THE APPLICATION

The embodiments described below provide a proxy-based encryption method, a proxy-based decryption method, a network equipment, a network device and a system, which can improve the reliability and security of proxy-based transmission of encrypted files.

The embodiments adopt the following technical solutions:

A proxy-based encryption method, including:

generating, according to a private key of a sending end and a public key of a receiving end, proxy keys that correspond to at least two proxy servers, respectively, where the number of the proxy keys is equal to the number of the at least two proxy servers; and sending encrypted ciphertexts and the proxy keys that correspond to the at least two proxy servers respectively to the at least two proxy servers, respectively, so that the at least two proxy servers re-encrypt the encrypted ciphertexts according to the corresponding proxy keys, respectively.

A proxy-based decryption method, including:

obtaining encrypted ciphertexts re-encrypted by at least two proxy servers;

performing decryption preprocessing on the encrypted ciphertexts re-encrypted by the at least two proxy servers, to generate preprocessed ciphertexts; and decrypting the preprocessed ciphertexts.

A network equipment, including:

a proxy key generating module, configured to generate, according to a private key of the network equipment and a public key of a receiving end, proxy keys that correspond to at least two proxy servers, respectively, where the number of the proxy keys is equal to the number of the at least two proxy servers; and a sending module, configured to send encrypted ciphertexts and the proxy keys that correspond to the at least two proxy servers respectively to the at least two proxy servers, respectively, so that the at least two proxy servers re-encrypt the encrypted ciphertexts according to the corresponding proxy keys, respectively.

A network device, including:

an obtaining module, configured to obtain encrypted ciphertexts re-encrypted by at least two proxy servers;

a decryption preprocessing module, configured to perform decryption preprocessing on the encrypted ciphertexts re-encrypted by the at least two proxy servers, to generate preprocessed ciphertexts; and a decrypting module, configured to decrypt the preprocessed ciphertexts.

A proxy-based network system, including: at least one of the network equipments, at least one of the network devices and at least two proxy servers.

In the embodiments, a sending end generates, according to a private key of the sending end and a public key of a receiving end, multiple proxy keys that correspond to multiple proxy servers respectively, while the receiving end obtains encrypted ciphertexts re-encrypted by the multiple proxy servers for decryption, so that the number of the proxy servers actually participating in transmission is far more than one, thereby preventing the case that when there is only one proxy server participating in transmission, a transmission process is forced to end due to the failure of the proxy server that may occur, and improving the reliability and security of proxy re-encryption based transmission.

BRIEF DESCRIPTION OF THE DRAWINGS

To make the technical solutions of the embodiments clearer, the accompanying drawings for illustrating the embodiments are described below. The accompanying drawings only about illustrate exemplary embodiments. It is understood that persons of ordinary skill in the art can derive other embodiments from the accompanying drawings without any creative effort.

DETAILED DESCRIPTION OF THE EMBODIMENTS

The technical solutions of the embodiments are elaborated below with reference to accompanying drawings. The embodiments described below are merely exemplary. All other embodiments, which can be derived by persons of ordinary skill in the art from the embodiments without any creative effort are understood to fall within the protection scope of the claims.

Embodiment 1

Figure 1:
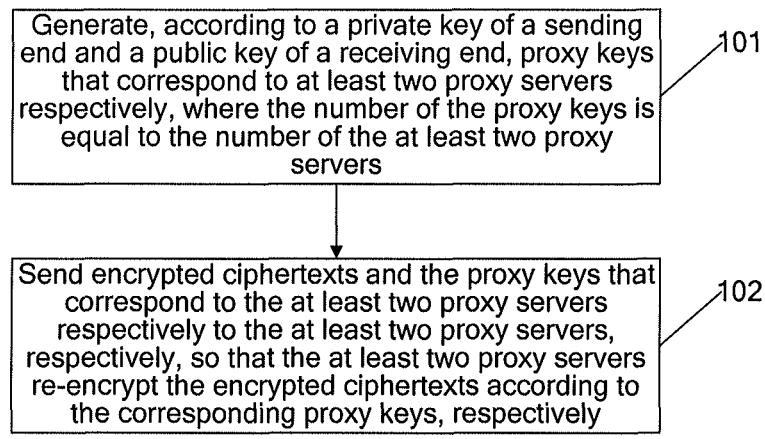
FIG. 1 is a flow chart of a proxy-based encryption method in an embodiment.

An embodiment provides a proxy-based encryption method, and as shown in FIG. 1, the method includes:

Step 101: Generate, according to a private key of a sending end and a public key of a receiving end, proxy keys that correspond to at least two proxy servers, respectively, where the number of the proxy keys being equal to the number of the at least two proxy servers.

In the embodiment, at least two proxy servers are used to perform proxy re-encryption, and proxy keys whose quantity is equal to the quantity of the used proxy servers are at least generated by the sending end, so as to ensure that each proxy server has the corresponding proxy key to re-encrypt a ciphertext sent from and encrypted by the sending end.

Furthermore, to enhance the reliability and security of the proxy re-encryption, the generated proxy keys whose quantity is equal to the quantity of the proxy servers are different from one another.

It should be noted that the proxy servers may be all proxy servers visible to a current system, and may also be enough proxy servers selected to participate in transmission from all the proxy servers by the sending end according to its own requirements, for example, the sending end selects the proxy servers with stronger operational capacity or lager transmission capacity from all the proxy servers.

Step 102: Send the encrypted ciphertexts and the proxy keys that correspond to the at least two proxy servers respectively to the at least two proxy servers, respectively, so that the at least two proxy servers re-encrypt the encrypted ciphertexts according to the corresponding proxy keys, respectively.

Figure 2:
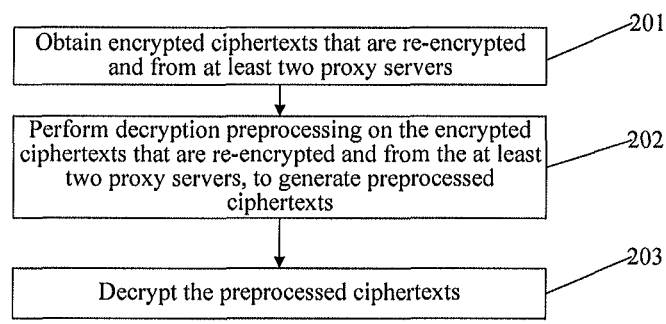
FIG. 2 is a flow chart of a proxy-based decryption method in an embodiment.
Figure 3:
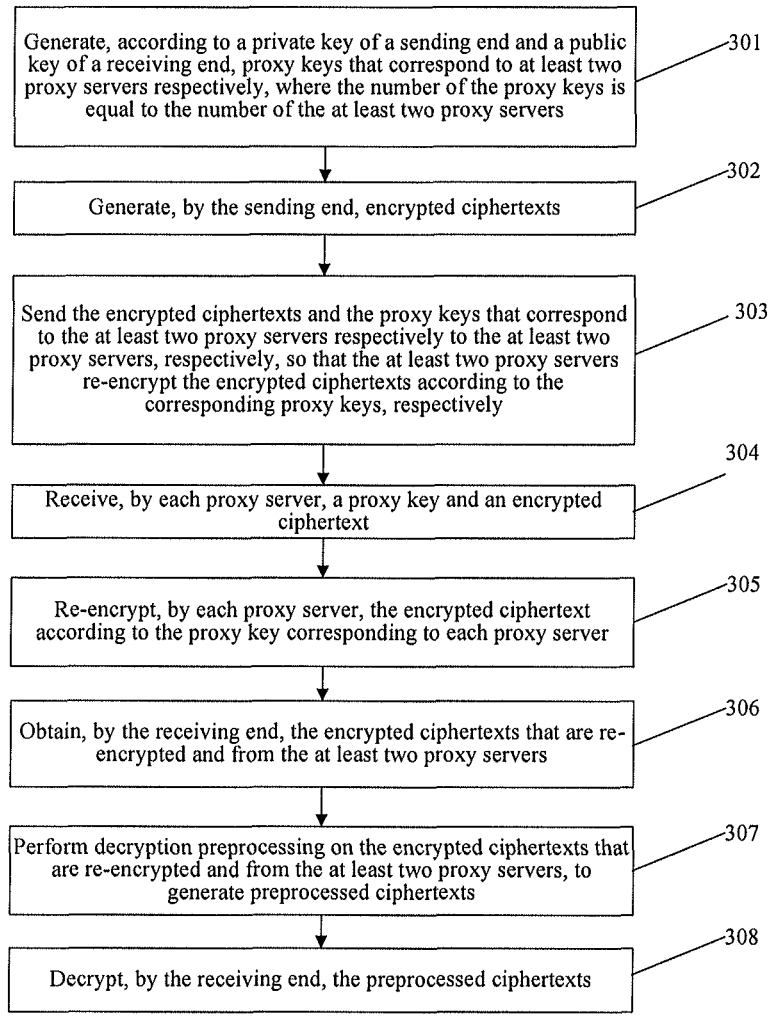
FIG. 3 is a flow chart of a proxy re-encryption based transmission method in an embodiment.

An embodiment further provides a proxy-based decryption method, and as shown in FIG. 2, the method includes:

Step 201: Obtain encrypted ciphertexts that are re-encrypted and from at least two proxy servers.

Step 202: Perform decryption preprocessing on the encrypted ciphertexts that are re-encrypted and from the at least two proxy servers, to generate preprocessed ciphertexts.

In the embodiment, each proxy server performs proxy re-encryption on an encrypted ciphertext by using a proxy key corresponding to the proxy server. Because the proxy key corresponding to each proxy server is different from one another, the encrypted ciphertext that is re-encrypted by each proxy server is different as well. For security consideration, a receiving end simultaneously receives at least two encrypted ciphertexts that are re-encrypted and simultaneously performs decryption preprocessing on the multiple received encrypted ciphertexts that are re-encrypted, so as to generate preprocessed ciphertexts.

Step 203: Decrypt the preprocessed ciphertexts.

The specific content of the ciphertexts can be obtained by decrypting the preprocessed ciphertexts according to the method of the prior art.

The following are specific embodiments of a method of performing proxy re-encryption based transmission by using the proxy-based encryption method and the proxy-based decryption method.

Step 301: Generate, according to a private key of a sending end and a public key of a receiving end, proxy keys that correspond to at least two proxy servers, respectively, where the number of the proxy keys is equal to the number of the proxy servers.

Figure 4:
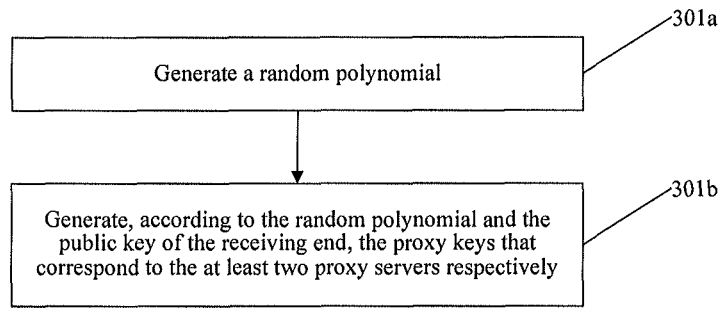
FIG. 4 is a flow chart of a method of generating proxy keys in an embodiment.

As shown in FIG. 4, step 301 specifically includes:

Step 301a: Generate a random polynomial $f(x)=c_k x^k + c_{k-1} x^{k-1} + \ldots + c_1 x + a$, where k, $c_k$, $c_{k-1}$, ... $c_1$ are constants, a is the private key of the sending end, $1 \leq x \leq n$, n is the number of the at least two proxy servers, and the degree k of the random polynomial is smaller than the number of the proxy servers.

The sending end selects the degree k of the polynomial according to security requirements of ciphertexts to be sent. The greater the k is, the larger the number of terms of the random polynomial $f(x)=c_k x^k + c_{k-1} x^{k-1} + \ldots + c_1 x + a$ is, and the more complicated the form is.

Step 301b: Generate, according to the random polynomial and the public key of the receiving end, proxy keys that correspond to the at least two proxy servers, respectively.

Here, step 301b is specifically:

calculating a corresponding value f(i) of the obtained random polynomial according to x=i, the proxy keys turning out to be $g^{f(i)b}$ by calculation, where $g^b$ is the public key of the receiving end, $1 \leq i \leq n$, and n is the number of the at least two proxy servers.

It can be learned from step 301a that the greater the k is, the larger the number of terms of the random polynomial $f(x)=c_k x^k + c_{k-1} x^{k-1} + \ldots + c_1 x + a$ is, and the more complicated the form is. After each value of x=i is substituted into the random polynomial $f(x)=c_k x^k + c_{k-1} x^{k-1} + \ldots + c_1 x + a$, differences between the corresponding values f(i) become greater, and differences between the proxy keys $g^{f(i)b}$ increase as well, thereby improving the security of the ciphertexts to be sent.

The values of i are consecutive positive integers from 1 to n, where n is the number of the proxy servers that are selected by the sending end to participate in re-encryption of the encrypted ciphertexts.

Step 302: Generate, by the sending end, the encrypted ciphertexts.

The sending end uses its own public key $Z^a$ to encrypt the ciphertext that needs to be encrypted and is to be transmitted to the receiving end. In the embodiment, the ciphertext is an element m belonging to a cyclic group H whose order is a prime number p.

In the embodiment, a system provides two cyclic groups G and H whose orders are the same prime number p, where the meaning of the cyclic groups can be expressed as: the generator of G is g, and each element in G is the power of g; similarly, the generator of H is h, and each element in H is the power of h. Furthermore, the result obtained after bilinear mapping is performed on G is H, and the bilinear mapping is a type of function mapping; the function mapping may be completed by using the Miller algorithm, and will not be expanded here.

After being encrypted by the sending end, the encrypted ciphertext is $(g^l, mZ^{al})$, where Z is a value obtained after the generator g of G undergoes bilinear mapping e(g,g).

Step 303: Send the encrypted ciphertexts and the proxy keys that correspond to the at least two proxy servers respectively to the at least two proxy servers, respectively, so that the at least two proxy servers re-encrypt the encrypted ciphertexts according to the corresponding proxy keys, respectively.

The sending end selects multiple proxy servers for transmission according to actual requirements. It is assumed that, during transmission of the ciphertexts, the sending end selects three proxy servers to participate in transmission and re-encryption, the three proxy servers are a first proxy server, a second proxy server and a third proxy server for the sending end, a proxy key that is corresponding to the first proxy server and is generated by the sending end is $g^{f(1)b}$, a proxy key that is corresponding to the second proxy server and is generated by the sending end is $g^{f(2)b}$, and a proxy key that is corresponding to the third proxy server and is generated by the sending end is $g^{f(3)b}$, it can be learned from the above analysis that the values of f(1), f(2) and f(3) are different from each other, so the three proxy keys corresponding to the three proxy servers are different from each other as well.

In the embodiment, the proxy servers are sequenced and numbered by the sending end according to a characteristic of each of the selected proxy servers, for example, the proxy servers are sequenced and numbered by the sending end according to transmission capacity of the proxy servers, or sequenced and numbered by the sending end according to transmission speeds of the proxy servers.

Step 304: Receive, by each proxy server, the proxy key and an encrypted ciphertext.

Further, after receiving the corresponding proxy key, each proxy server stores the proxy key, so that when the same sending end transmits another encrypted ciphertext to the same receiving end again, the sending end does not need to generate a proxy key and send the proxy key to the corresponding proxy server again.

Step 305: Re-encrypt, by each proxy server, the encrypted ciphertext according to the proxy key corresponding to each proxy server.

It can be learned from step 302 that the form of the encrypted ciphertext generated by the sending end is $(g^l, mZ^{al})$. It is assumed that a fifth proxy server performs re-encryption at this moment, the fifth proxy server performs bilinear mapping on $g^l$ and the corresponding proxy key $g^{f(5)b}$ to obtain $Z^{lf(5)b}$, to generate an encrypted ciphertext $(Z^{lbf(5)}, mZ^{al})$ that is re-encrypted.

It can be learned that because the proxy key of each proxy server is different from one another, the encrypted ciphertext that is re-encrypted and corresponds to each proxy key is different from one another as well.

Step 306: Obtain, by the receiving end, the encrypted ciphertexts that are re-encrypted and from at least two proxy servers.

Because the proxy key corresponding to each proxy server is different from one another, re-encryption performed on the encrypted ciphertext by each proxy server is different as well. For security consideration, the receiving end can finally obtain correct ciphertexts through decryption only after receiving at least k+1 encrypted ciphertexts that are re-encrypted, where the k is the highest degree of the random polynomial generated by the sending end.

Step 307: Perform, by the receiving end, decryption preprocessing on the encrypted ciphertexts that are re-encrypted and from the at least two proxy servers, to generate preprocessed ciphertexts.

Figure 5:
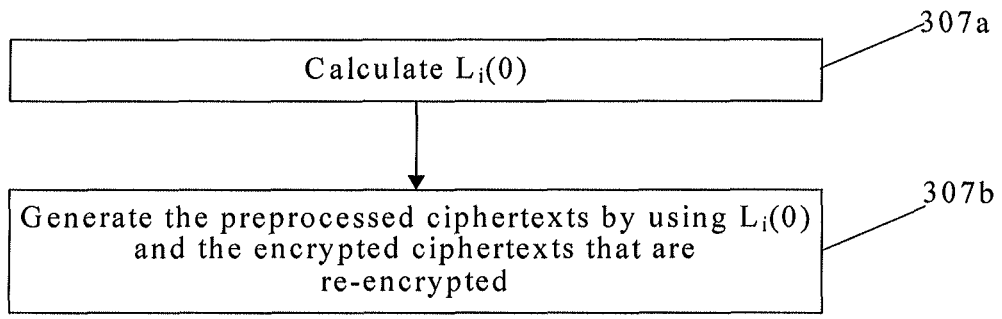
FIG. 5 is a flow chart of a decryption preprocessing method in an embodiment.

As shown in FIG. 5, step 307 specifically includes:

Step 307a: Calculate $$L_i(0) = \prod_{\substack{1 \leq m \leq k+1 \\ i \neq m}} \frac{-m}{i-m}, 1 \leq i \leq k+1,$$

where k is the degree of the random polynomial $f(x)=c_k x^k + c_{k-1} x^{k-1} + \ldots + c_1 x + a$ used for generating the proxy keys corresponding to the at least two proxy servers, $c_k, c_{k-1}, \ldots c_1$ are constants, a is the private key of the sending end, $1 \leq x \leq n$, and n is the number of the at least two proxy servers.

It should be noted that this operation is an operation based on a finite field $F_p$, and the result of the operation is an element in the finite field $F_p$, in short, that is, the result $L_i(0)$ of the operation is an integer, where $1 \leq i \leq k+1$.

Further, it is defined that a finite field is a field only containing multiple elements. A simplest finite field is a remainder ring Y/(p) obtained by taking the modulus of a prime number p from an integer ring Y, consisting of p elements 0, 1, ... p−1 which are added and multiplied by means of taking the modulus of p.

Step 307b: Use $L_i(0)$ and the encrypted ciphertexts that are re-encrypted to calculate $$\prod_{i=1}^{k+1} (Z^{lb \cdot f(i)})^{L_i(0)} = Z^{lb \sum_{i=1}^{k+1} f(i) L_i(0)},$$

where Z is a value of the bilinear mapping e(g,g), g is a generator of a cyclic group; and $$Z^{lb \sum_{i=1}^{k+1} f(i) L_i(0)}$$

is a specific form of the preprocessed ciphertexts.

$f(x)=c_k x^k + c_{k-1} x^{k-1} + \ldots + c_1 x + a$, so f(0)=a; and according to the Lagrange interpolation polynomial, $$f(0) = \sum_{i=1}^{k+1} f(i) L_i(0), \text{ so } Z^{lb \sum_{i=1}^{k+1} f(i) L_i(0)} = Z^{lba}.$$

Step 308: Decrypt, by the receiving end, the preprocessed ciphertexts.

Similar to the prior art, the receiving end performs decryption by using its own private key b and the other part $mZ^{ak}$ of the encrypted ciphertexts that are re-encrypted, and the specific calculation is $$\frac{mZ^{al}}{Z^{\frac{lab}{b}}} = m.$$

Accordingly, the ciphertext m sent by the sending end to the receiving end is received by the receiving end successfully.

It should be noted that the sending end and the receiving end of the embodiment each may be computers and mobile phones. Furthermore, in the embodiment, for the convenience of description, the function of the sending end and the function of the receiving end are distinguished strictly, and actually the sending end may also be the receiving end, that is, the same equipment not only can send an encrypted ciphertext, but also can receive and decrypt the encrypted ciphertext.

In the technical solutions of this embodiment, the sending end generates, according to the private key of the sending end and the public key of the receiving end, multiple proxy keys that correspond to multiple proxy servers respectively, while the receiving end obtains the encrypted ciphertexts, which are re-encrypted and are from the multiple proxy servers, for decryption, so that the number of the proxy servers actually participating in transmission is far more than one, thereby preventing the case that when only one proxy server participates in the transmission, a transmission process is forced to end due to the failure of the proxy server that may occur, and improving the reliability and security of proxy re-encryption based transmission.

Embodiment 2

Figure 6:
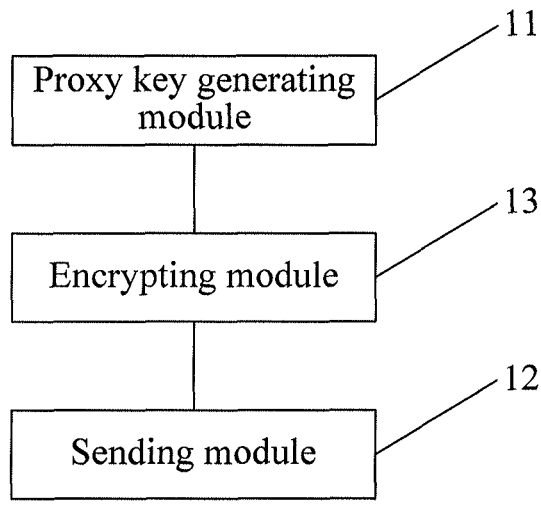
FIG. 6 is a schematic structural diagram of a network equipment in an embodiment.

An embodiment provides a network equipment, and as shown in FIG. 6, the network equipment includes a proxy key generating module 11 and a sending module 12.

The proxy key generating module 11 is configured to generate, according to a private key of the network equipment and a public key of a receiving end, proxy keys that correspond to at least two proxy servers, respectively, where the number of the proxy keys is equal to the number of the at least two proxy servers.

In the embodiment, at least two proxy servers are used to perform proxy re-encryption, and the proxy key generating module 11 at least generates proxy keys whose quantity is equal to the quantity of the used proxy servers, so as to ensure that each proxy server has the corresponding proxy key to re-encrypt a ciphertext that is sent and encrypted by the network equipment.

Furthermore, to enhance the security and reliability of proxy re-encryption, the proxy keys whose quantity is equal to the quantity of the proxy servers are different from one another, where the proxy keys are generated by the proxy key generating module 11.

It should be noted that the proxy servers may be all proxy servers visible to a current system, and may also be enough proxy servers selected to participate in transmission from all the proxy servers by the network equipment according to its own requirements, for example, the network equipment selects the proxy servers with stronger operational capacity or lager transmission capacity from all the proxy servers.

The proxy key generating module 11 is specifically configured to:

generate a random polynomial $f(x)=c_k x^k + c_{k-1} x^{k-1} + \ldots + c_1 x + a$, where k, $c_k, c_{k-1}, \ldots c_1$ are constants, a is the private key of the network equipment, $1 \leq x \leq n$, n is the number of the at least two proxy servers, and the degree k of the random polynomial is smaller than the number of the proxy servers.

The network equipment selects the degree k of the random polynomial according to security requirements of the ciphertexts to be sent. The greater the k is, the larger the number of terms of the random polynomial $f(x)=c_k x^k + c_{k-1} x^{k-1} + \ldots + c_1 x + a$ is, and the more complicated the form is.

The proxy key generating module 11 is further configured to:

generate, according to the random polynomial and the public key of the receiving end, proxy keys that correspond to the at least two proxy servers, and specifically to:

calculate a corresponding value f(i) of the obtained random polynomial according to x=i, the proxy keys turning out to be $g^{f(i)b}$ by calculation, where $g^b$ is the public key of the receiving end, $1 \leq i \leq n$, and n is the number of the proxy servers.

Because the greater the k is, the larger the number of terms of the random polynomial $f(x)=c_k x^k + c_{k-1} x^{k-1} + \ldots + c_1 x + a$ is, and the more complicated the form is. After each value of x=i is substituted into the random polynomial $f(x)=c_k x^k c_{k-1} x^{k-1} + \ldots + c_1 x + a$, differences between the corresponding values f(i) become greater, and differences between the proxy keys $g^{f(i)b}$ increase as well, thereby improving the security of the ciphertexts to be sent.

The values of i are consecutive positive integers from 1 to n, where n is the number of the proxy servers that are selected by the network equipment to participate in re-encryption of the encrypted ciphertexts.

The sending module 12 is configured to send the encrypted ciphertexts and the proxy keys that correspond to the at least two proxy servers respectively to the at least two proxy servers, respectively, so that the at least two proxy servers re-encrypt the encrypted ciphertexts according to the corresponding proxy keys, respectively.

The network equipment selects multiple proxy servers for transmission according to actual requirements. It is assumed that, during transmission of the ciphertexts, the network equipment selects three proxy servers to participate in transmission and re-encryption, the three proxy servers are a first proxy server, a second proxy server and a third proxy server for the network equipment, a proxy key that is corresponding to the first proxy server and is generated by the network equipment is $g^{f(1)b}$, a proxy key that is corresponding to the second proxy server and is generated by the network equipment is $g^{f(2)b}$, and a proxy key that is corresponding to the third proxy server and is generated by the network equipment is $g^{f(3)b}$, it can be learned from the above analysis that the values of f(1), f(2) and f(3) are different from each other, so the three proxy keys corresponding to the three proxy servers are different from each other as well.

In the embodiment, the proxy servers are sequenced and numbered by the network equipment according to a characteristic of each of the selected proxy servers, for example, the proxy servers are sequenced and numbered by the network equipment according to transmission capacity of the proxy servers, or sequenced and numbered by the network equipment according to transmission speeds of the proxy servers.

The network equipment further includes:

an encrypting module 13, configured to generate an encrypted ciphertext.

The encrypting module 13 uses the public key $Z^a$ of the network equipment to encrypt the ciphertext that needs to be encrypted and is to be transmitted to the receiving end, where in the embodiment, the ciphertext is an element m belonging to a cyclic group H whose order is a prime number p.

In the embodiment, a system provides two cyclic groups G and H whose orders are the same prime number p, where the meaning of the cyclic groups can be expressed as: the generator of G is g, and each element in G is the power of g;

similarly, the generator of H is h, and each element in H is the power of h. Furthermore, the result obtained after bilinear mapping is performed on G is H, and the bilinear mapping is a type of function mapping; the function mapping may be completed by using the Miller algorithm, and will not be expanded here.

After being encrypted by the encrypting module 13, the encrypted ciphertext is $(g^l, mZ^{al})$, where Z is a value obtained after the generator g of G undergoes bilinear mapping e(g,g).

Figure 7:
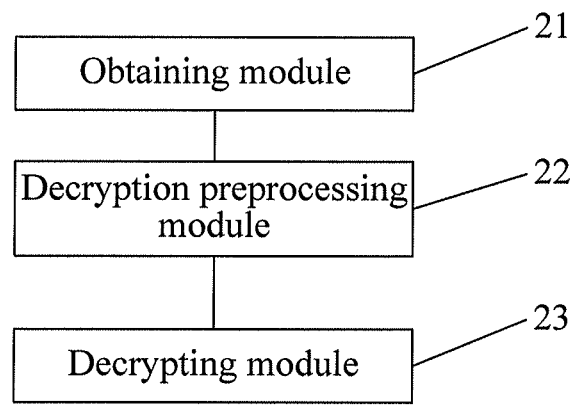
FIG. 7 is a schematic structural diagram of a network device in an embodiment.

An embodiment further provides a network device, and as shown in FIG. 7, the network device includes an obtaining module 21, a decryption preprocessing module 22, and a decrypting module 23.

The obtaining module 21 is configured to obtain encrypted ciphertexts that are re-encrypted and from at least two proxy servers.

Because the proxy key corresponding to each proxy server is different from one another, re-encryption performed on the encrypted ciphertext by each proxy server is different as well. For security consideration, the obtaining module 21 of the network equipment can finally obtain correct ciphertexts through decryption only after receiving at least k+1 encrypted ciphertexts that are re-encrypted, where the k is the highest degree of a random polynomial generated by a sending end.

The decryption preprocessing module 22 is configured to perform decryption preprocessing on the encrypted ciphertexts that are re-encrypted, to generate preprocessed ciphertexts.

The decryption preprocessing module 22 is specifically configured to:
calculate $$L_i(0) = \prod_{\substack{1 \le m \le k+1 \\ i \ne m}} \frac{-m}{i-m}, 1 \le i \le k+1,$$

where k is the degree of the random polynomial $f(x)=c_k x^k + c_{k-1} x^{k-1} + \ldots + c_1 x + a$ used for generating the proxy keys corresponding to the at least two proxy servers, $c_k, c_{k-1}, \ldots c_1$ are constants, a is a private key of the sending end, $1 \le x \le n$, and n is the number of the at least two proxy servers.

It should be noted that this operation is an operation based on a finite field $F_p$, and the result of the operation is an element in the finite field $F_p$, in short, that is, the result $L_1(0)$ of the operation is an integer, where $1 \le i \le k+1$.

Further, it is defined that a finite field is a field only containing multiple elements. A simplest finite field is a remainder ring Y/(p) obtained by taking the modulus of a prime number p from an integer ring Y, consisting of p elements 0, 1, ... p−1 which are added and multiplied by means of taking the modulus of p.

The decryption preprocessing module 22 is further configured to:
use $L_1(0)$ and the encrypted ciphertexts that are re-encrypted to calculate $$\prod_{i=1}^{k+1} (Z^{lbf(i)})^{L_i(0)} = Z^{lb\sum_{i=1}^{k+1} f(i)L_i(0)},$$

where Z is a value of bilinear mapping e(g,g), g is a generator of a cyclic group; and $$Z^{lb\sum_{i=1}^{k+1} f(i)L_i(0)}$$

is a specific form of the preprocessed ciphertexts.

Here, it can be learned from the above description that the encrypted ciphertexts sent to the proxy servers by the sending end are $(g^l, mZ^{al})$, and the form of each generated proxy key is $g^{f(i)b}$, so that the form of the encrypted ciphertexts that are re-encrypted by the proxy servers is $(Z^{lbf(i)}, mZ^{al})$, the encrypted ciphertexts are re-encrypted by different proxy servers, and items $Z^{lbf(i)}$ in the encrypted ciphertexts that are re-encrypted are different.

$f(x)=c_k x^k + c_{k-1} x^{k-1} + \ldots + c_1 x + a$, so $f(0)=a$; and according to the Lagrange interpolation polynomial, $$f(0) = \sum_{i=1}^{k+1} f(i)L_i(0), \text{ so } Z^{lb\sum_{i=1}^{k+1} f(i)L_i(0)} = Z^{lba}.$$

The decrypting module 23 is configured to decrypt the preprocessed ciphertexts.

Similar to the prior art, the decrypting module 23 performs decryption by using a private key b of the network device and the other part $mZ^{ak}$ of the encrypted ciphertexts that are re-encrypted, and the specific calculation is $$\frac{mZ^{al}}{Z^{\frac{lab}{b}}} = m.$$

Accordingly, the ciphertext m sent by the sending end to the network device is received by the network device successfully.

Figure 8:
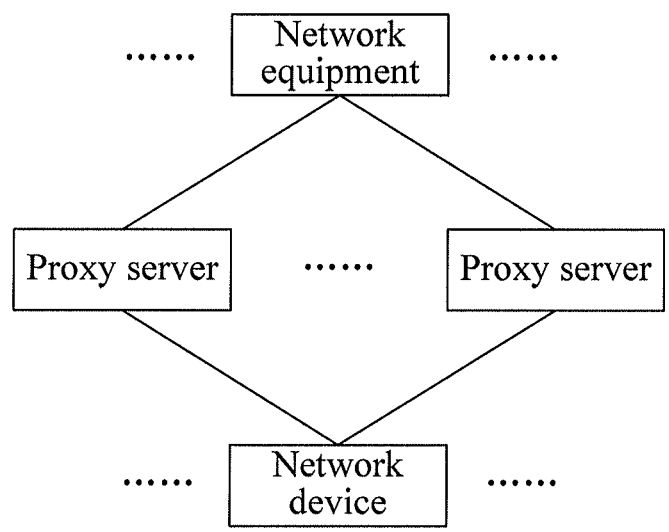
FIG. 8 is a schematic structural diagram of a proxy-based network system in an embodiment.

An embodiment further provides a proxy-based encryption and decryption system, and as shown in FIG. 8, the system includes:
at least one network equipment described above, at least one network device described above, and at least two proxy servers, where the at least two proxy servers are configured to re-encrypt encrypted ciphertexts according to corresponding proxy keys, respectively.

It should be noted that the network equipment and the network device of the embodiment each may be computers, mobile phones or the like.

In the technical solutions of this embodiment, the network equipment generates, according to the private key of the network equipment and the public key of the network device, multiple proxy keys that correspond to multiple proxy servers respectively, while the network device obtains the encrypted ciphertexts, which are re-encrypted and are from the multiple proxy servers, for decryption, so that the number of the proxy servers actually participating in transmission is far more than one, thereby preventing the case that when only one proxy server participates in the transmission, a transmission process is forced to end due to the failure of the proxy server that may occur, and improving the reliability and security of proxy re-encryption based transmission.

The method of the embodiment may be executed by a universal integrated circuit (for example, a central processing unit, CPU) or an application-specific integrated circuit (ASIC). The device, module and unit of the embodiment may be the universal integrated circuits (for example, the central processing units, CPUs), the application-specific integrated circuits (ASICs) or other equipments.

Through the above description of the embodiments, it is clear to persons skilled in the art that the embodiments may be embodied in software plus necessary universal hardware, and definitely may also be accomplished by hardware, but in many cases, the former is preferred. Based on such understanding, the essence of the technical solutions or the part that makes contributions to the prior art can be embodied in the form of a software product. The computer software product is stored in a readable storage medium, for example, a floppy disk, hard disk, or optical disk of a computer, and contains several instructions used to instruct a computer equipment (for example, a personal computer, a server, or a network equipment) to perform the method according to each embodiment.

Persons of ordinary skill in the art may be aware that the exemplary units and algorithm steps described in the embodiments disclosed herein can be implemented by electronic hardware, or a combination of computer software and electronic hardware. Whether those functions are executed by hardware or software depends on the particular application and the design constraint conditions of the technical solutions. Persons skilled in the art can use different methods to implement the described functions for every particular application, but it should not be considered that such implementation goes beyond the scope.

It can be clearly understood by persons skilled in the art that, for the purpose of convenient and brief description, for the specific working process of the foregoing system, device and unit, reference may be made to the corresponding process in the method embodiments, and the details will not be described herein again.

In the embodiments provided in the present application, it should be understood that the disclosed system, device, and method may be implemented in other manners. For example, the described device embodiments are merely exemplary. For example, the unit division is merely logical function division, and can be other division in actual implementation. For example, multiple units or components can be combined or integrated into another system, or some features can be ignored or not performed. In addition, the displayed or discussed mutual couplings or direct couplings or communication connections are implemented through some interfaces. The indirect couplings or communication connections between the devices or units may be implemented in electronic, mechanical or other forms.

The units described as separate parts may or may not be physically separate, and parts displayed as units may or may not be physical units, that is, they may be located in one position, or may be distributed on multiple network elements. A part or all of the units may be selected according to actual requirements to achieve the objectives of the solutions of the embodiments.

In addition, function units in each embodiment may be integrated into a processing unit, or each of the units may exist alone physically, or two or more units are integrated into a unit.

The above description is merely exemplary and is not intended to limit the protection scope of the claims. Any variation or replacement that can be easily derived by those skilled in the art within the technical scope disclosed above shall fall within the protection scope of the claims.

What is claimed is:

1. A proxy-based encryption method, comprising:
   generating, according to a private key of a sending end and a public key of a receiving end, at least two proxy keys that correspond to at least two proxy servers, respectively, wherein a number of the proxy keys is equal to a number of the proxy servers; and
   sending encrypted ciphertexts and the at least two proxy keys that correspond to the at least two proxy servers, respectively, to the at least two proxy servers, respectively, so that the at least two proxy servers re-encrypt the encrypted ciphertexts according to the corresponding proxy keys, respectively;
   wherein the step of generating at least two proxy keys that correspond to at least two proxy servers respectively comprises:
   generating a random polynomial $f(x)=c_k x^k + c_{k-1} x^{k-1} + \ldots + c_1 x + a$, wherein $k$, $c_k$, $c_{k-1}$, ... $c_1$ are constants, a is the private key of the sending end, $1 \leq x \leq n$, n is the number of the at least two proxy servers, and the degree k of the random polynomial is smaller than the number of the at least two proxy servers; and
   generating, according to the random polynomial and the public key of the receiving end, the proxy keys that corresponds to the at least two proxy servers, respectively.

2. The method according to claim 1, wherein generation, according to the random polynomial and the public key of the receiving end, of the proxy keys that correspond to the at least two proxy servers respectively comprises:
   calculating a corresponding value f (i) of the generated random polynomial according to x=i, the proxy keys being $g^{f(i)b}$ by calculation, wherein $g^b$ is the public key of the receiving end, $1 \leq i \leq n$, and n is the number of the at least two proxy servers.

3. A proxy-based decryption method, comprising:
   obtaining encrypted ciphertexts from at least two proxy servers, wherein the ciphertexts are re-encrypted according to at least two proxy keys by the corresponding at least two proxy servers, respectively;
   performing decryption preprocessing on the encrypted ciphertexts to generate preprocessed ciphertexts; and
   decrypting the preprocessed ciphertexts,
   wherein the step of performing decryption preprocessing on the encrypted ciphertexts comprises:
   calculating $$L_i(0) = \prod_{\substack{1 \leq m \leq k+1 \\ i \neq m}} \frac{-m}{i-m}, 1 \leq i \leq k+1,$$

wherein k is a degree of a random polynomial $f(x)=c_k x^k + c_{k-1} x^{k-1} + \ldots + c_1 x + a$ used for generating proxy keys corresponding to the at least two proxy servers, $c_k$, $c_{k-1}$, ... $c_1$ are constants, a is a private key of a sending end, $1 \leq x \leq n$, and n is the number of the at least two proxy servers; and
   using $L_i(0)$ and the encrypted ciphertexts that are re-encrypted to calculate $$\prod_{i=1}^{k+1} (Z^{lb\,f(i)})^{L_i(0)} = Z^{lb \sum_{i=1}^{k+1} f(i) L_i(0)},$$

wherein Z is a value of bilinear mapping e(g,g), g is a generator of a cyclic group; and $$Z^{lb \sum_{i=1}^{k+1} f(i) L_i(0)}$$

is a specific form of the preprocessed ciphertexts.

4. Network equipment, comprising:
   a proxy key generator module configured to generate according to a private key of the network equipment and a public key of a receiving end, and at least two proxy keys that correspond to at least two proxy servers respectively, wherein a number of the proxy keys is equal to the number of the proxy servers; and a sender module configured to send encrypted ciphertexts and the at least two proxy keys that correspond to the at least two proxy servers, respectively, to the at least two proxy servers, respectively, so that the at least two proxy servers re-encrypt the encrypted ciphertexts according to the corresponding proxy keys, respectively, wherein the proxy key generator module is configured to:

generate a random polynomial $f(x)=c_k x^k + c_{k-1} x^{k-1} + \ldots + c_1 x + a$, wherein k, $c_k, c_{k-1}, \ldots c_1$ are constants, a is the private key of a sending end, $1 \leq x \leq n$, n is the number of the at least two proxy servers, and the degree k of the random polynomial is smaller than the number of the at least two proxy servers; and generate, according to the random polynomial and the public key of the receiving end, the proxy keys that corresponds to the at least two proxy servers, respectively.

5. The network equipment according to claim 4 wherein the proxy key generator module is configured to:

calculate a corresponding value Pi) of the generated random polynomial according to x=i, the proxy keys being $g^{f(i)b}$ by calculation, wherein $g^b$ is the public key of the receiving end, $1 \leq i \leq n$, and n is the number of the at least two proxy servers.

6. A proxy-based network system comprising:

at least one network equipment that includes:

a proxy key generator module configured to generate according to a private key of the network equipment and a public key of a receiving end, and at least two proxy keys that correspond to at least two proxy servers respectively, wherein a number of the proxy keys is equal to the number of the proxy servers;

a sender module configured to send encrypted ciphertexts and the at least two proxy keys that correspond to the at least two proxy servers, respectively, to the at least two proxy servers, respectively, so that the at least two proxy servers re-encrypt the encrypted ciphertexts according to the corresponding proxy keys, respectively at least one network device that includes:

an obtaining module configured to obtain encrypted ciphertexts that are re-encrypted and from at least two proxy servers;

a decryption preprocessing module configured to perform decryption preprocessing on the encrypted ciphertexts, and to generate preprocessed ciphertexts;

a decrypting module configured to decrypt the preprocessed ciphertexts;

at least two proxy servers, wherein the at least two proxy servers are configured to re-encrypt encrypted ciphertexts according to corresponding proxy keys, respectively; and wherein the proxy key generator module is configured to:

generate a random polynomial $f(x)=c_k x^k + c_{k-1} x^{k-1} + \ldots + c_1 x + a$, wherein k, $c_k, c_{k-1}, \ldots c_1$ are constants, a is the private key of a sending end, $1 \leq x \leq n$, n is the number of the at least two proxy servers, and the degree k of the random polynomial is smaller than the number of the at least two proxy servers; and generate, according to the random polynomial and the public key of the receiving end, the proxy keys that corresponds to the at least two proxy servers, respectively.

* * * * *